(12) United States Patent
Shipman (10) Patent No.: US 8,131,617 B2
(45) Date of Patent: *Mar. 6, 2012

(54) METHOD AND APPARATUS FOR VERIFYING THE LEGITIMACY OF A FINANCIAL INSTRUMENT

(75) Inventor: Ty Shipman, Berkeley, CA (US)

(73) Assignee: Kagi, Inc., Berkeley, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 12/512,558

(22) Filed: Jul. 30, 2009

(65) Prior Publication Data

US 2009/0287607 A1   Nov. 19, 2009

Related U.S. Application Data (63) Continuation of application No. 11/219,713, filed on Sep. 7, 2005, now Pat. No. 7,588,181.

(51) Int. Cl.
*G06Q 40/00* (2006.01)

(52) U.S. Cl. .......................................................... 705/35

(58) Field of Classification Search ............... 705/26, 705/26.1, 26.82, 52, 53, 67, 72, 75, 35, 39, 705/40; 235/379, 380

See application file for complete search history.

(56) References Cited

U.S. PATENT DOCUMENTS

| | | | |
|---|---|---|---|
| 4,743,747 A | | 5/1988 | Fougere et al. |
| 4,988,849 A | * | 1/1991 | Sasaki et al. .................. 235/379 |
| 5,311,594 A | | 5/1994 | Penzias |
| 5,384,449 A | | 1/1995 | Peirce |
| 5,416,306 A | | 5/1995 | Imahata |
| 5,478,993 A | | 12/1995 | Derksen |
| 5,479,510 A | | 12/1995 | Olsen et al. |
| 5,708,422 A | | 1/1998 | Blonder et al. |
| 5,727,163 A | | 3/1998 | Bezos |
| 5,757,917 A | | 5/1998 | Rose et al. |
| 5,790,429 A | | 8/1998 | Baker et al. |

(Continued)

FOREIGN PATENT DOCUMENTS

| | | | |
|---|---|---|---|
| CA | 2303041 | * | 9/2001 |

(Continued)

OTHER PUBLICATIONS

Information Week; "I.D. Under Lock and Key: Banks face mounting pressure from consumers to take action against identity theft. Are they moving fast enough to beat the hackers and phishers? (identification cards)"; Nov. 15, 2004; pp. 1 and 2.*

(Continued)

*Primary Examiner* — Ella Colbert
(74) *Attorney, Agent, or Firm* — Diederiks & Whitelaw PLC (57) ABSTRACT

An apparatus and method for verifying the legitimacy of a financial instrument used by a shopper is disclosed. A seller accepts details about goods and services to be delivered, and information about a financial instrument to be used in a purchase by a shopper. Identifier information is send to a financial institution issuing the instrument. The legitimate user of the instrument must access the instruments issuer's database to obtain the identifier information and derive verification information needed to answer a question posed by the seller. If the shopper can prove possession of the verification information then the goods are shipped or delivered to the shopper and payment is settled. The questions used to prove the shopper has the verification information may come in a variety of forms such as simple math equations, anagrams, or word to symbol matching problems.

21 Claims, 11 Drawing Sheets

U.S. PATENT DOCUMENTS

| | | | |
|---|---|---|---|
| 5,790,790 A | 8/1998 | Smith et al. | |
| 5,809,144 A | 9/1998 | Sirbu et al. | |
| 5,822,727 A | 10/1998 | Garberg et al. | |
| 5,822,737 A | 10/1998 | Ogram | |
| 5,826,241 A | 10/1998 | Stein et al. | |
| 5,872,917 A | 2/1999 | Hellman | |
| 5,878,337 A | 3/1999 | Joao et al. | |
| 5,883,810 A | 3/1999 | Franklin et al. | |
| 5,907,142 A | 5/1999 | Kelsey | |
| 5,909,492 A | 6/1999 | Payne et al. | |
| 5,963,917 A | 10/1999 | Ogram | |
| 5,978,774 A | 11/1999 | Rogers et al. | |
| 5,991,738 A | 11/1999 | Ogram | |
| 6,000,832 A | 12/1999 | Franklin et al. | |
| 6,014,650 A | 1/2000 | Zampese | |
| 6,021,399 A | 2/2000 | Demers et al. | |
| 6,023,682 A | 2/2000 | Checchio | |
| 6,029,150 A | 2/2000 | Kravitz | |
| 6,032,863 A | 3/2000 | Nethery, III | |
| 6,058,179 A | 5/2000 | Shaffer et al. | |
| 6,067,529 A | 5/2000 | Ray et al. | |
| 6,070,798 A | 6/2000 | Nethery | |
| 6,088,683 A | 7/2000 | Jalili | |
| 6,095,413 A | 8/2000 | Tetro et al. | |
| 6,122,624 A | 9/2000 | Tetro et al. | |
| 6,192,407 B1 | 2/2001 | Smith et al. | |
| 6,205,437 B1 | 3/2001 | Gifford | |
| 6,226,624 B1 | 5/2001 | Watson et al. | |
| 6,227,447 B1 | 5/2001 | Campisano | |
| 6,246,996 B1 | 6/2001 | Stein et al. | |
| 6,307,958 B1 * | 10/2001 | Deaton et al. | 382/139 |
| 6,327,348 B1 | 12/2001 | Walker | |
| 6,341,724 B2 | 1/2002 | Campisano | |
| 6,381,584 B1 | 4/2002 | Ogram | |
| 6,385,504 B1 | 5/2002 | Pintsov et al. | |
| 6,477,578 B1 | 11/2002 | Mhoon | |
| 6,496,936 B1 | 12/2002 | French et al. | |
| 6,612,488 B2 | 9/2003 | Suzuki | |
| 6,836,765 B1 | 12/2004 | Sussman | |
| 6,839,692 B2 | 1/2005 | Carrott et al. | |
| 6,981,216 B1 | 12/2005 | Brandes | |
| 7,275,685 B2 | 10/2007 | Gray et al. | |
| 7,403,922 B1 | 7/2008 | Lewis et al. | |
| 7,451,114 B1 * | 11/2008 | Matsuda et al. | 705/39 |
| 7,478,057 B2 * | 1/2009 | Alfano | 705/26.35 |
| 7,588,181 B2 * | 9/2009 | Shipman | 235/379 |
| 7,752,102 B2 * | 7/2010 | Thomas | 705/35 |
| 2001/0001204 A1 | 5/2001 | Campisano | |
| 2001/0003175 A1 | 6/2001 | Kim | |
| 2001/0029496 A1 | 10/2001 | Otto et al. | |
| 2001/0044785 A1 | 11/2001 | Stolfo et al. | |
| 2001/0056410 A1 | 12/2001 | Ishigaki | |
| 2002/0004772 A1 | 1/2002 | Templeton et al. | |
| 2002/0016765 A1 | 2/2002 | Sacks | |
| 2002/0023054 A1 | 2/2002 | Gillespie | |
| 2002/0052841 A1 | 5/2002 | Guthrie et al. | |
| 2002/0069177 A1 | 6/2002 | Carrott et al. | |
| 2002/0077978 A1 | 6/2002 | O'Leary et al. | |
| 2002/0082995 A1 | 6/2002 | Christie, IV | |
| 2002/0083008 A1 * | 6/2002 | Smith et al. | 705/64 |
| 2002/0084329 A1 | 7/2002 | Kaye et al. | |
| 2002/0116329 A1 * | 8/2002 | Serbetcioglu et al. | 705/39 |
| 2002/0120846 A1 | 8/2002 | Stewart et al. | |
| 2002/0130176 A1 | 9/2002 | Suzuki | |
| 2002/0147600 A1 * | 10/2002 | Waters et al. | 705/1 |
| 2002/0156724 A1 | 10/2002 | Levchin et al. | |
| 2002/0165830 A1 | 11/2002 | Kremer | |
| 2003/0002639 A1 | 1/2003 | Huie | |
| 2003/0055781 A1 | 3/2003 | Ong | |
| 2003/0061163 A1 | 3/2003 | Durfield | |
| 2003/0061167 A1 | 3/2003 | Mann, III et al. | |
| 2003/0101134 A1 | 5/2003 | Liu et al. | |
| 2003/0126036 A1 | 7/2003 | Mascavage, III et al. | |
| 2003/0140230 A1 * | 7/2003 | de Jong et al. | 713/182 |
| 2003/0200182 A1 | 10/2003 | Truitt et al. | |
| 2004/0019564 A1 * | 1/2004 | Goldthwaite et al. | 705/44 |
| 2004/0078340 A1 | 4/2004 | Evans | |
| 2004/0088258 A1 | 5/2004 | McCoy et al. | |
| 2004/0230527 A1 | 11/2004 | Hansen et al. | |
| 2004/0254867 A1 | 12/2004 | Nethery, III | |
| 2005/0075985 A1 | 4/2005 | Cartmell | |
| 2005/0097049 A1 | 5/2005 | Writer et al. | |
| 2005/0138429 A1 * | 6/2005 | Miura | 713/201 |
| 2006/0026097 A1 | 2/2006 | Nethery | |

FOREIGN PATENT DOCUMENTS

| | | | |
|---|---|---|---|
| CA | 2 309 013 | | 11/2001 |
| DE | 200 14 381 | | 1/2001 |
| JP | 403074788 A | | 3/1991 |
| WO | WO 9948326 | * | 9/1999 |
| WO | WO 02/05224 | | 1/2002 |
| WO | WO 02/17181 | | 2/2002 |
| WO | WO 03/017049 | | 2/2003 |

OTHER PUBLICATIONS

Computing; "News—What the banks are doing"; Nov. 18, 2004; p. 1.*

Goldman, Gerald and McClain, Scott K.; "Reassessing the risks of the check cashing industry"; ABA Bank Compliance, V23, n9; Sep./Oct. 2002; pp. 1-4.*

Card News, V.3, N.20; "Test of Electronic Data Capture System Begins for Credit-Card Verification Procedure At Arby's"; Oct. 10, 1988; p. 1.*

Brad Stone, "Busting the Web Bandits", Newsweek, pp. 55, Jul. 16, 2001.

Bodow, Steve, "The Money Shot", Wired Magazine, Issue 9.09, Sep. 2001.

European Patent Office, European Search Report, EP 04253347, Oct. 7, 2004.

Office Action dated Jul. 9, 2008 in U.S. Appl. No. 10/902,046.

Office Action dated Apr. 24, 2008 in U.S. Appl. No. 10/457,548.

* cited by examiner

METHOD AND APPARATUS FOR VERIFYING THE LEGITIMACY OF A FINANCIAL INSTRUMENT

CROSS-REFERENCE TO RELATED APPLICATIONS

This application is a continuation of U.S. patent application Ser. No. 11/219,713 filed on Sep. 7, 2005 entitled "Method and Apparatus for Verifying the Legitimacy of a Financial Instrument", pending.

BACKGROUND OF THE INVENTION

1. Field of the Invention

The present invention is generally directed to an apparatus and method for verifying the legitimacy of a financial instrument used by a shopper to transfer funds in a transaction and, more particularly, transactions involving transfer of funds with any financial instrument, i.e., credit payment instrument, debit payment instrument or electronic fund transfer, to a merchant's account during business transactions.

2. Discussion of the Prior Art

Increasingly, shoppers and merchants involved in commerce are turning to the Internet to conduct electronic business transactions. The Internet is particularly attractive to shoppers as it provides a vast knowledge base from which they can research and find information about perspective goods to be purchased. Time can be saved because the shopper does not have to physically travel to various locations, such as a library or store, to obtain information regarding the various goods to be purchased. Instead, the entire process of shopping for goods and services can be completed using a personal computer at one's home so long as the computer is connected to a network, such as the Internet. As time has passed, opportunities for shopping via personal computer have increased as more and more people gain access to the Internet and more and more businesses provide store-like services on the Internet.

Likewise, using the Internet for commerce is extremely attractive to businesses as they can provide the same type of information that has traditionally been provided through catalogs and other advertising at a much lower cost. Furthermore, transactions can occur between shoppers and merchants in a similar manner as those conducted at a check-out stand in a physical store. Indeed, in the case of digital products, such as computer software, videos, music or funds transfer, the goods or services themselves can be delivered through the Internet and payment can be received through the Internet so that the entire transaction occurs through a computer network without the shopper or merchant ever physically meeting in a traditional store. This method of doing business provides tremendous cost savings to the manufacturers and merchants. Even items that need to be shipped can benefit from this form of commerce. Once a shopper has browsed through a merchant's website, selected various goods or services that he or she wishes to purchase and enters financial instrument information, the transaction can be finalized by the merchant.

To finalize the transaction, the merchant simply needs to verify the legitimacy of the financial instrument, arrange collection of the payment and then ship the goods to the shopper. The verification of the financial instrument is the riskiest step in the process. Over time, the verification process has become fraught with problems due mainly to the inability of the banking industry to add to its current verification process because of the millions of installed merchant users. Because of these problems, merchants may incorrectly identify fraudulent shoppers as legitimate shoppers because the information used in a verification process can be forged and legitimate shoppers may be incorrectly identified as possible fraudulent shoppers when they provide slightly inaccurate data to the merchant. This state of affairs has caused some businesses to restrict commerce on the Internet to require processes that involve human interaction at some level. These restrictions have had negative effects on Internet sales. The problem facing merchants is how to determine that a financial instrument and its associated financial account actually belong to the shopper attempting to use the instrument in a remote purchase.

The number one priority of all merchants is sales. The second priority is avoiding fraud. In cases of fraud, in order to avoid financial loss when a financial instrument holder repudiates a transaction, a merchant must prove that the goods were actually delivered to the financial instrument holder and that the shopper was the holder of the financial instrument used for payment. Unfortunately, given the skillfulness of today's fraud rings and the lack of response from financial institutions to the worldwide fraud epidemic, merchants are on the losing end of this battle. Large fraud rings can intercept packages of goods en route and the merchant will loose any dispute with the financial instrument's issuer (the financial institution) should a shopper repudiate usage of the financial instrument or deny accepting delivery of the goods. Even the Address Verification System (AVS) used in the United States and Canada to verify billing address data can be defeated and is not available internationally. In the case of digitally shipped goods such as music, data, or software, the AVS system is useless because no physical shipment takes place and the transaction is considered "card not present" by the financial institutions. In such a case, even a legitimate financial instrument holder can initiate a charge back (repudiate the transaction) at any point. In a "payment instrument not present" situation, typically the merchant loses the dispute and thus incurs losses greater than the amount of the original value.

Given this state of affairs, it becomes very important to a merchant to be able to verify that the user of a financial instrument, the shopper, is a legitimate instrument owner, or has permission of the legitimate owner to use the instrument, before shipping the ordered goods. If such a validation mechanism were available, the merchants would have a more powerful argument against refunding money to a financial instrument (charge-back) when a legitimate instrument owner complains that the instrument was used in a fraudulent manner. A particularly strong argument for the merchant would include a way to prove to the financial instrument issuer (the financial institution) that the financial instrument issuer believed that the person using the financial instrument was the legitimate instrument owner at the time of purchase.

One proposed solution to this problem of course is that a shopper can provide some type of data about him or herself to the merchant, along with a credit payment instrument, a debit payment instrument, or a funds account number, which can be transmitted over the network. However, the problem of validating the shopper as the legitimate owner of the financial instrument still exists because the merchant has limited abilities to cross check the data provided by the shopper with the instrument issuer. For example, there exists no current way to cross the name on the account verses the shopper's identity. Thus, current mechanisms do not address the problem of a shopper using a stolen credit instrument, a stolen debit instrument or some other funds payment instrument. As such, a dishonest person could use a stolen financial instrument's data and present it at the merchant's network site as their own, and the merchant has no way to either approve or disapprove such data.

Even if the merchant is using all available anti-fraud, systems provided by the financial instrument's issuer and some proprietary or third party anti-fraud systems, the merchant still might not realize they are dealing with a stolen financial instrument at the time of the transaction. Only after the goods are shipped and delivered, and a significant time period has passed, would the merchant realize that an illegitimate person used a financial instrument. In the case where a credit, debit or funds account number has been stolen, thousands of dollars can be lost to the honest merchant who accepts the data and completes the fraudulent transactions. Not until the account is canceled can the harm be stopped. The true cost of this crime can only be totaled after the dust settles.

In the end, the issuer of the credit, debit or finds account is ultimately accountable for the lost moneys because they self-insure themselves and their members against fraud to promote safety of the instrument to shoppers. In most cases, the issuer of the instrument will hold the merchant liable for the money that was debited from the financial instrument. If the dishonest party is a merchant and is in league with users of stolen instrument data, the dishonest merchant usually will close up shop long before the issuer is able to reclaim the money lost. Since the issuer does not hold a legitimate account owner liable, the issuer is responsible for the lost money. However, in the case of a lawful merchant, the lawful merchant retains the responsibility of verifying legitimacy of the financial instrument presenter to protect themselves from dishonest persons using stolen financial instruments or account numbers.

A few companies using the Internet have proposed solutions to this problem. One proposed solution is set forth by Templeton et al. in U.S. Patent Application Publication No. 2002/0004772 directed to a system and method for verifying a financial instrument, which is incorporated herein by reference. Templeton et al. proposes a system initiating one or more verifying transactions involving an instrument with details that may vary from one transaction to another such as the type of transaction (deposit, credit or debit), amount of the transaction, number of transactions, the merchant or vender name or account for the transaction, and so on. Selected details, particularly variable ones, are saved to the system. The user obtains information regarding a transaction by accessing the account on-line, via telephone, in a monthly statement, etc. The user then submits the requested details to the system, which compares them to stored details. If the details correspond, then the user may be allowed to use the instrument to purchase a product.

In one embodiment, the system of Templeton et al. deposits into a U.S. financial institution account two very small deposits of money, each of which is between one and ninety-nine cents before the main transaction occurs. The shopper must check the financial institution account to obtain the small deposit amounts and then provide the amounts to the system in order to verify that the financial institution account presented is actually their account. Unfortunately, this method has some distinct disadvantages. First, money is being sent to an account that may never actually be used. Second, this method requires several transactions, for example, the system initially has to send money to the account in order to verify that the account is valid and, presumably, this must be done for every account that is used. While such an amount may be small per transaction, when millions of transactions are involved, such costs can rise quickly. Furthermore, this process may have to be repeated over time to ensure the accounts have not been canceled or compromised. Only after the account has been verified can the system conduct an actual financial transaction. It must be remembered that the whole goal of the Internet is to provide an efficient, time saving and low cost method of doing business. Every additional action a shopper must take in order to provide security can result in lost business for a merchant.

Additionally, the Templeton et al. publication does not address the problems of foreign currency transactions. Since there are fluctuations in foreign currency rates, it would be difficult to confirm amounts charged to a financial instrument without knowing the exact date of the transaction and the exchange rate on that date used by the financial instrument issuer. Perhaps most important no coding is used. In other words all a computer or person has to do is read the amount of the transaction and send that number back to the merchant. A fraudulent shopper could in theory automate this process and easily defeat the system proposed by Templeton et al. by posting random values to the merchant until they get it correct.

Therefore, there exists a need in the art for a method and apparatus which will allow a merchant, or other recipients of funds, to get as close to a non-repudiation situation as possible by establishing that the shopper is the financial instrument's legitimate owner. Essentially, the invention should rely on the fact that if the shopper can convince the instrument issuer that they are the legally responsible party for the instrument, the merchant should also be able to believe that the shopper trying to use the instrument is allowed to use the instrument. Further such a system must have some coding mechanism that is simple enough to aid in a the merchant's ability to verify the legitimacy of the financial instrument used by the shopper but complicated enough that it is difficult to defeat by a person using an illegitimate financial instrument.

SUMMARY OF THE INVENTION

In general, the invention is directed to a method of verifying ownership of financial instruments, i.e., credit payment instruments, debit payment instrument numbers, financial institution accounts, etc. More specifically, a credit payment instrument, debit number or financial institution account used by a shopper can be verified while a purchase of goods is being made so that illegal transactions and fraud can be avoided. After a merchant accepts financial instrument information from the shopper, the merchant processes the payment in one or more steps. Before the goods are released (shipped to the shopper or transferred to his/her control), the shopper is asked a question that requires the use of identifier information that the merchant incorporates in one or more data fields of the financial transaction data sent to the financial instrument's issuer (financial institution). The information is sent to the financial instrument account at the same time as the payment transfer request. The shopper must be able to convince the financial institution that they are a legitimate owner of the financial instrument in order to access the financial instrument account and thus the identifier information. The merchant then asks the shopper a question or requires the shopper to conduct a task that requires the shopper to use some higher cognitive mental functions utilizing the identifier information in order to verify that the shopper is allowed to use the financial instrument. Most importantly the identifier information in an unaltered form is not used; that is to say, the identifier information transmitted to the financial institution is not passed on to the merchant in an unaltered form. Essentially a simple coding scheme is used and the shopper must convert the identifier information into verification information.

The identifier information provided to the shopper through the financial transaction data may be in the form of letters, numbers, a combination of letters and numbers, words or mathematical formulas. The verification information is a signal that the shopper could derive an answer to a question based on the identifier information. In addition, it should be realized that numerous types of questions could be used to test a shopper to ensure that they had accessed the identifier information and therefore that they are a lawful user of the financial instrument. Because a user of the financial instrument is able to prove to an issuing financial institution that they are the financial instrument's owner and can gain access to identifier information data to solve the question presented to them by a merchant, merchants can establish a stronger case for non-repudiation of the financial instrument's use.

Additional objects, features and advantages of the present invention will become more readily apparent from the following detailed description when taken in conjunction with the drawings wherein like reference numerals refer to corresponding parts in the several views.

DETAILED DESCRIPTION OF THE PREFERRED EMBODIMENT

Figure 1:
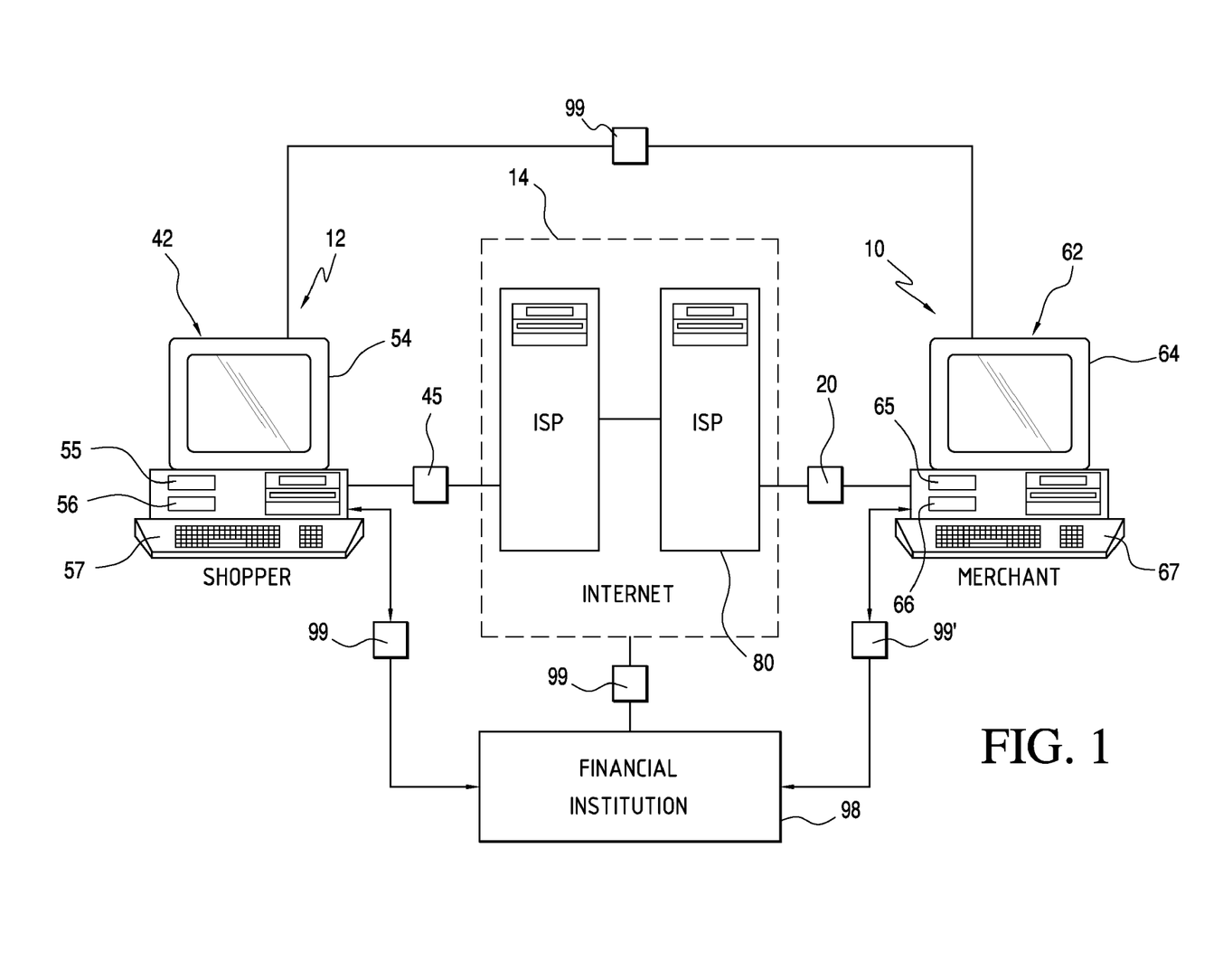
FIG. 1 is a diagram of a financial system having computers interconnected by the Internet for use in a product sale or purchase in accordance with the present invention.
Figure 2:
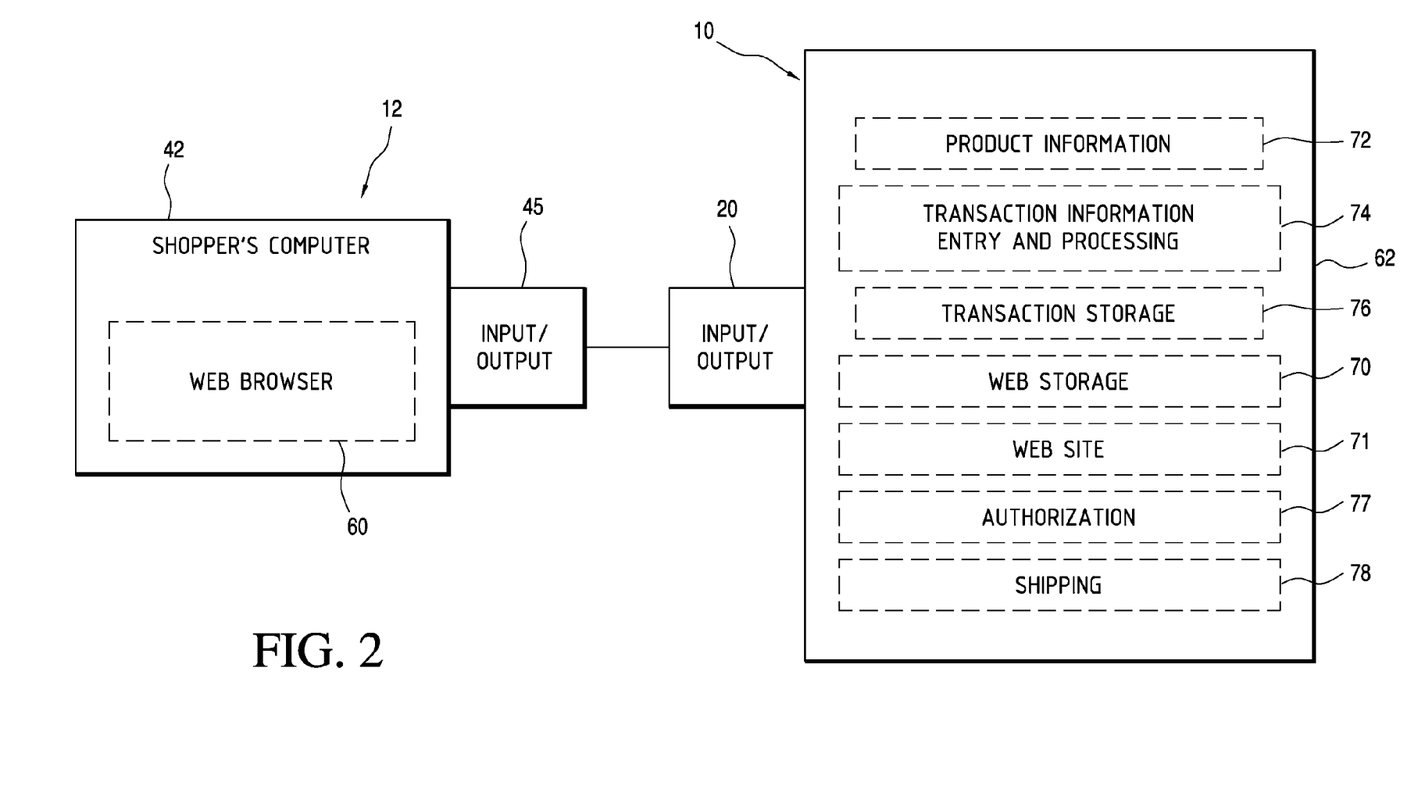
FIG. 2 is a block diagram illustrating in more detail the system shown in FIG. 1.

As shown in FIG. 1, a system for handling purchase orders and payments using an electronic communications link in accordance with a preferred embodiment of the present invention includes a merchant's computer system (or electronic store) 10 which can be selectively called upon by one or more shopper computer systems 12 over an electronic communications link such as the Internet 14. As illustrated in FIGS. 1 and 2, merchant's computer system 10 is formed of one or more computers and includes an input-output unit 20 for transmitting and receiving digital information to or from the Internet 14 and indirectly to an owner/shopper's computer 42. Likewise, a shopper's computer 42 is set up to contact the Internet 14 through an input-output unit 45. The shopper's computer 42 typically has a monitor 54, a central processing unit 55, some type of memory 56 and an input-output unit such as a keyboard 57. Typically when in use, shopper's computer 42 would have some type of operating system such as Macintosh, Unix or Windows, which would run the basic operations of the computing machine. Additionally, specialized applications such as a web browser 60 would be used to interpret the various protocols of Internet 14 into an understandable interface for a computer user, namely the shopper.

In a similar manner, a merchant's computer 62 may be formed of one or more computers, having one or more monitors 64, a central processing unit (data manager) 65, some type of memory 66 and an input-output device such as a keyboard 67. Additionally, various applications such as a web server (web storage) 70 and/or specialized applications that form a website 71 providing information regarding the merchant's products 72, and additional applications designed to process financial transactions 74 and/or provide a transaction storage database 76 for remembering and storing various bits of information regarding the various shoppers visiting the merchant's website. Further, the merchant's computer has the programming to compare inputted data, such as authorization data 77 to authorize shipping of goods 78.

Although in theory, the merchant's computer could be part of any data network, most preferably the merchant's computer system 10 is connected to the Internet 14 or an Internet service provider (ISP) 80 by a high speed integrated service digital network (ISDN), a T-1 line, a T-3 line or any other type of communication system with other computers or ISP's which typically form the Internet 14. Both merchant and shopper may communicate with a financial institution 98 using the Internet 14. Alternatively, the shopper, merchant and financial institution may contact each other by separate communication mechanisms 99 and 99'. Such communications could be by telephone, by talking person to person, or any other form of communication. Also although the terms shopper and merchant have been used it should be understood the invention may apply to anyone who wishes to verify the legitimacy of a financial instrument used any type of transaction.

Figure 3:
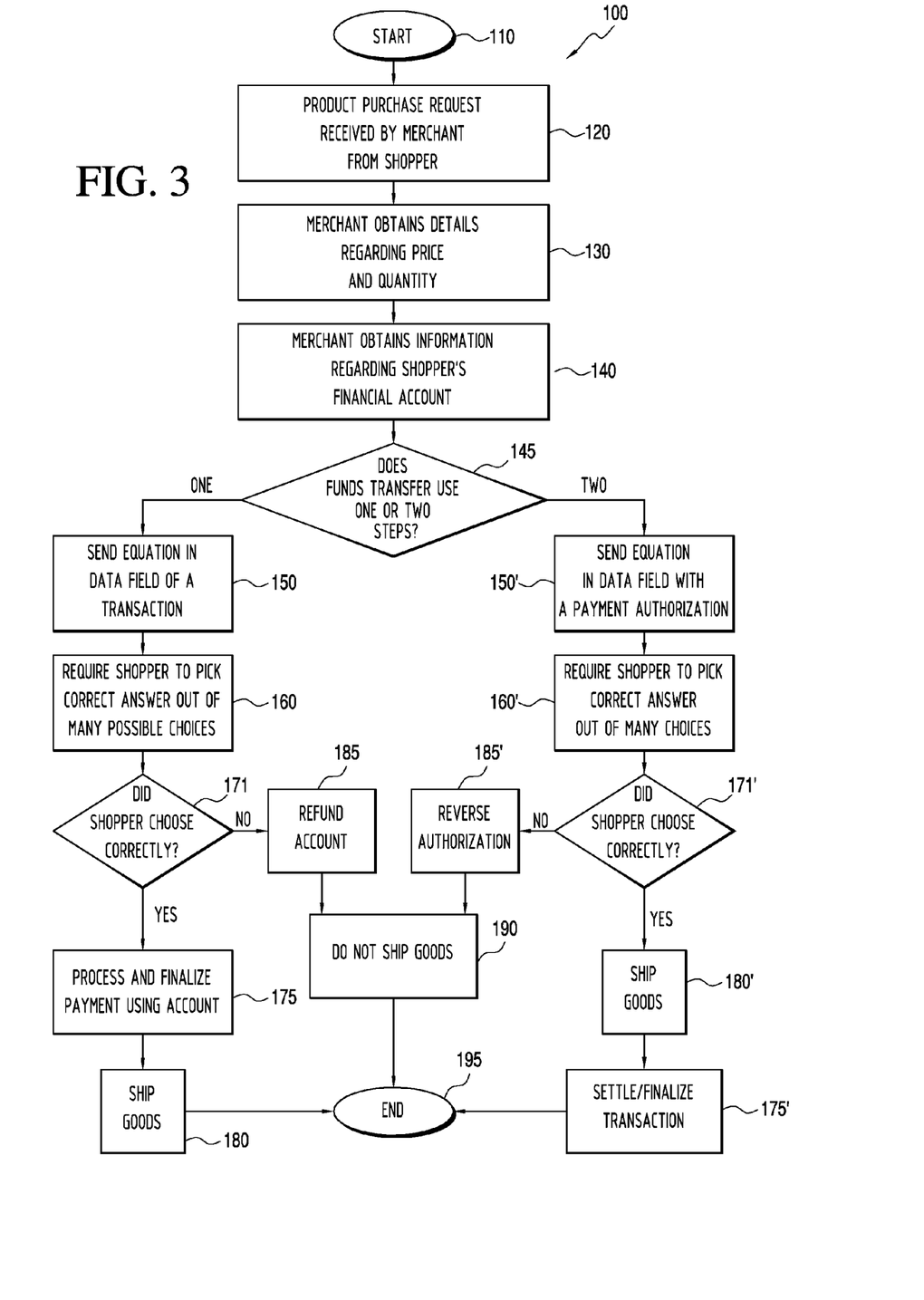
FIG. 3 is a flow chart of a procedure employed by a merchant to verify a financial instrument issued by a financial institution by requiring a shopper to solve an equation sent to the institution.

The operation of the merchant's computer system 10 will now be described with reference to FIG. 3, which shows a flow chart 100 indicating the various steps, starting at steps 110, of a verification process according to the first embodiment of the present invention. Initially, a shopper, by use of a web browser 60 or other communication system, contacts the merchant's computer 62 and obtains product information 72 from the merchant's website 71 or any other source which could be from any website, for example, the product's original manufacturers website. Generally, during this stage, the shopper might use several websites along the Internet 14 to obtain both price and quality information regarding particular goods or services. Often, on the merchant's website 71, the shopper might be presented with several choices by the browser interface to determine the various models, types and qualities of particular goods or services, along with various prices. Additional links may be provided to other web pages that provide further information on each product. In step 120, if the shopper desires to purchase one or more products, the shopper enters a product purchase request that is sent over the Internet 14 from the shopper's computer 12 to the merchant's computer 10. In step 130, the merchant's computer 10 receives various types of information regarding the purchase request including the type and quantity of goods to be purchased, along with the price of those goods. Additional information regarding the shopper is also obtained, such as a shipping address and other personal information. Such a transaction can be in the form of a series of questions that are answered by the shopper or, alternatively, everything can be entered on a form that is then sent in one transmission. If the form is incorrectly filled out, the merchant's computer 10 will query the shopper regarding the additional information needed.

In step 140, specific information regarding the shopper's financial instrument account (financial account) is obtained by the merchant. Once the merchant's computer 62 has obtained all the information, computer 62 at step 145 will determine if the funds transfer will use a two step payment process with an initial authorization and subsequent settlement or will use a one step payment process in which authorization and settlement will occur in one communication to the financial institution.

If the funds transfer is a one-step type process, then the computer 62 will follow a first path and begin processing the payment for the goods by conducting transaction with the issuer of the financial instrument (financial institution 98). In such a transaction, the computer 62 in step 150 sends identifier information in the form of an equation in a data field of the transaction. Such an equation might be a simple addition such as adding 10+876. The merchant's computer 62 then provides the shopper with several possible answers to the mathematical equation in step 160. At this point, the shopper contacts his/her financial institution 98, to obtain the identifier information (equation) contained in the transaction statement. The shopper then solves the equation and indicates on computer 42 the correct answer of those possible answers provided by the merchant. To obtain the equation, the financial institution 98 may be contacted either by visiting in person, by telephone, by the Internet 14 or by using any other form of communication. In step 171, the merchant's computer verifies that the shopper has picked the correct choice of the displayed possible answers. The merchant's computer does not need to store the identifier information but only the verification information. Indeed the idea is to confirm that the shopper can derive the verification information and that is done by confirming that the verification information correctly corresponds to or is in agreement with the verification information. If the correct choice is selected the shopper has shown he knows the verification information and the shopper's financial instrument account is then considered to be verified and not fraudulent and a merchant's computer processes or finalizes payment using the account in step 175. The merchant's computer then sends an order allowing the goods to be shipped, as shown in step 180. However, if the answer selected by the shopper does not match the merchant's computer, the process proceeds to step 185 where funds are returned to the account and then proceed to step 190 and the goods are not shipped. In either case, the process ends at step 195.

If at process step 145 the funds transfer is determined to be a two-step type process then the process begins by conducting an initial transaction with the issuer of the financial instrument (financial institution 98). The initial transaction is an authorization transaction that typically reserves a certain amount of money in the account. The transaction is temporary and if it is not settled will become stale and expire after a period of time. However, in the meantime it is visible to the owner of the financial account. In such a transaction, the computer 62, in step 150', sends identifier information in the form of an equation in a data field of the transaction. As was the case with step 150, such an equation might be a simple addition such as adding 10+876. The merchant's computer 62 then provides the shopper with several possible answers to the mathematical equation in step 160'. At this point, the shopper contacts his/her financial institution 98, to obtain the identifier information (equation) contained in the transaction statement. The shopper then solves the equation and indicates on computer 42 the correct answer of those possible answers provided by the merchant. To obtain the equation, the financial institution 98 may be contacted either by visiting in person, by telephone, by the Internet 14 or by using any other form of communication. In step 171', the merchant's computer verifies that the shopper has picked the correct choice of the displayed possible answers. If the correct choice is selected the shopper has shown he knows the verification information and the shopper's financial instrument account is then considered to be verified and not fraudulent and a merchant's computer processes or settles the previously authorized payment using the account in step 175'. The merchant's computer sends an order allowing the goods to be shipped, as shown in step 180'. The order may be given before or after the settlement step because money was already reserved in the authorization step 150'. However, if the answer selected by the shopper does not match, the process proceeds to step 185' where the authorization is reversed and voided, and in step 190 the goods are not shipped. If the financial institution does not support authorization reversals, after an amount of time the authorization becomes stale and disappears from the account. In the case of a stolen instrument no money is removed from the account. In either case, the process ends at step 195.

If the transaction completes successfully and the goods are shipped but a shopper repudiates the transaction, the merchant is in a relative good position to fight the repudiation. The merchant can prove to the financial institution that the financial institution itself thought the shopper was legitimate enough to provide access to the account. If the financial institution thought the shopper was legitimate then the merchant should be able to rely on that fact.

Additional embodiments of the present invention are described in FIGS. 4-11. Flow charts 200, 300, 400, 500, 600, 700, 800 and 900 depict verification methods in which the initial transaction between the merchant and the issuer of the shopper's financial instrument involves both one step and two-step type transactions. The steps that are substantially the same as the steps in process 100 will not be explained again. Instead, like reference numerals refer to corresponding steps such that only differences in the process will be discussed hereafter.

Figure 4:
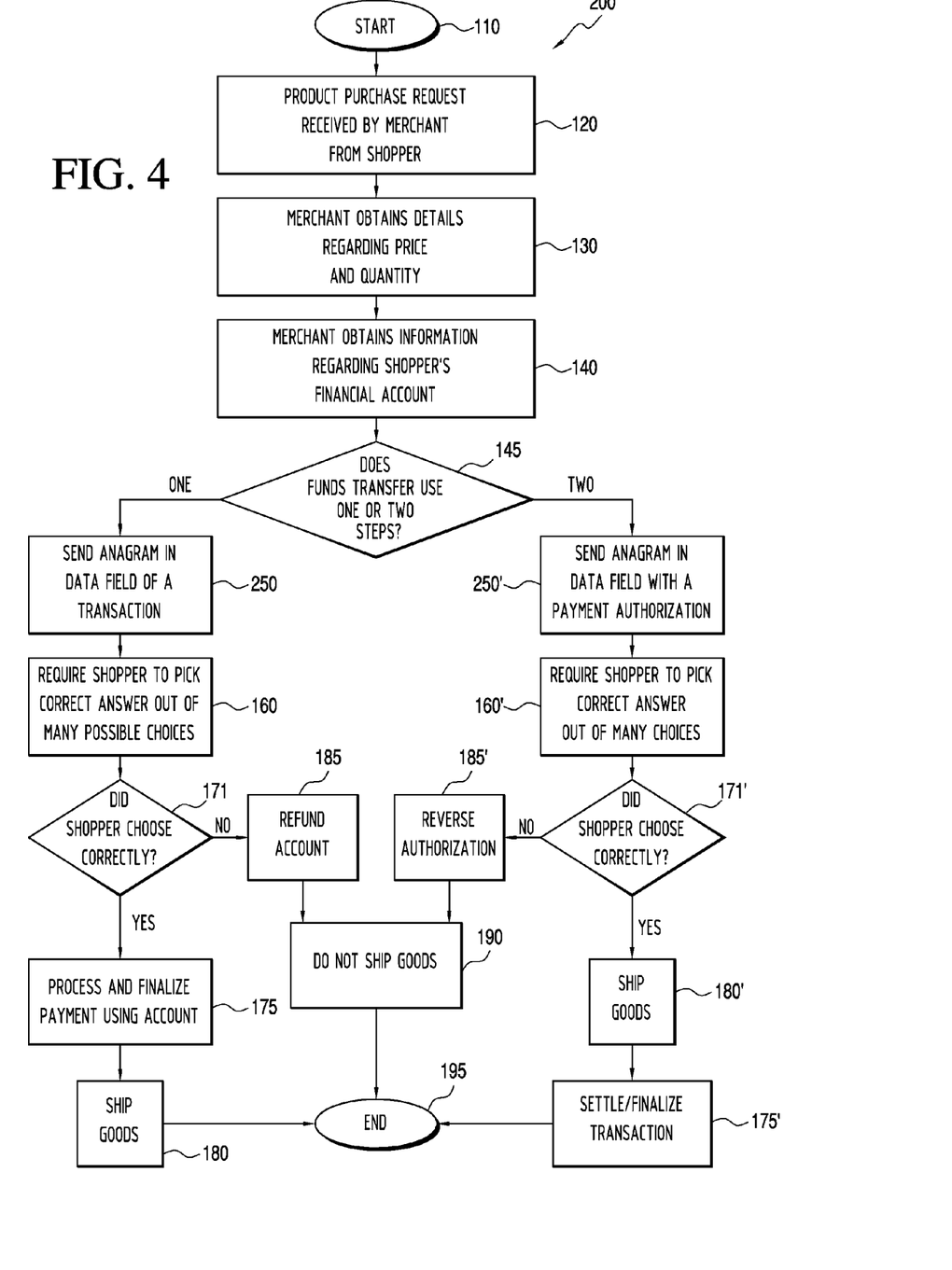
FIG. 4 is a flow chart of a procedure employed by a merchant to verify a financial instrument issued by a financial institution by requiring a shopper to solve an anagram sent to the institution.

With specific reference to FIG. 4, note that the steps 250 and 250' are different in that instead of sending an equation with transaction or authorization data as in steps 150 and 150' respectively, an anagram is sent. Any anagram of different letters can be sent, and then, in steps 160 and 160', the shopper can be required to pick out the correct answer out of many possible choices in a manner similar to that shown in FIG. 3. For example, characters "atc" could be used and an answer such as "cat" or "act" can be presented in a list of words on the website.

Figure 5:
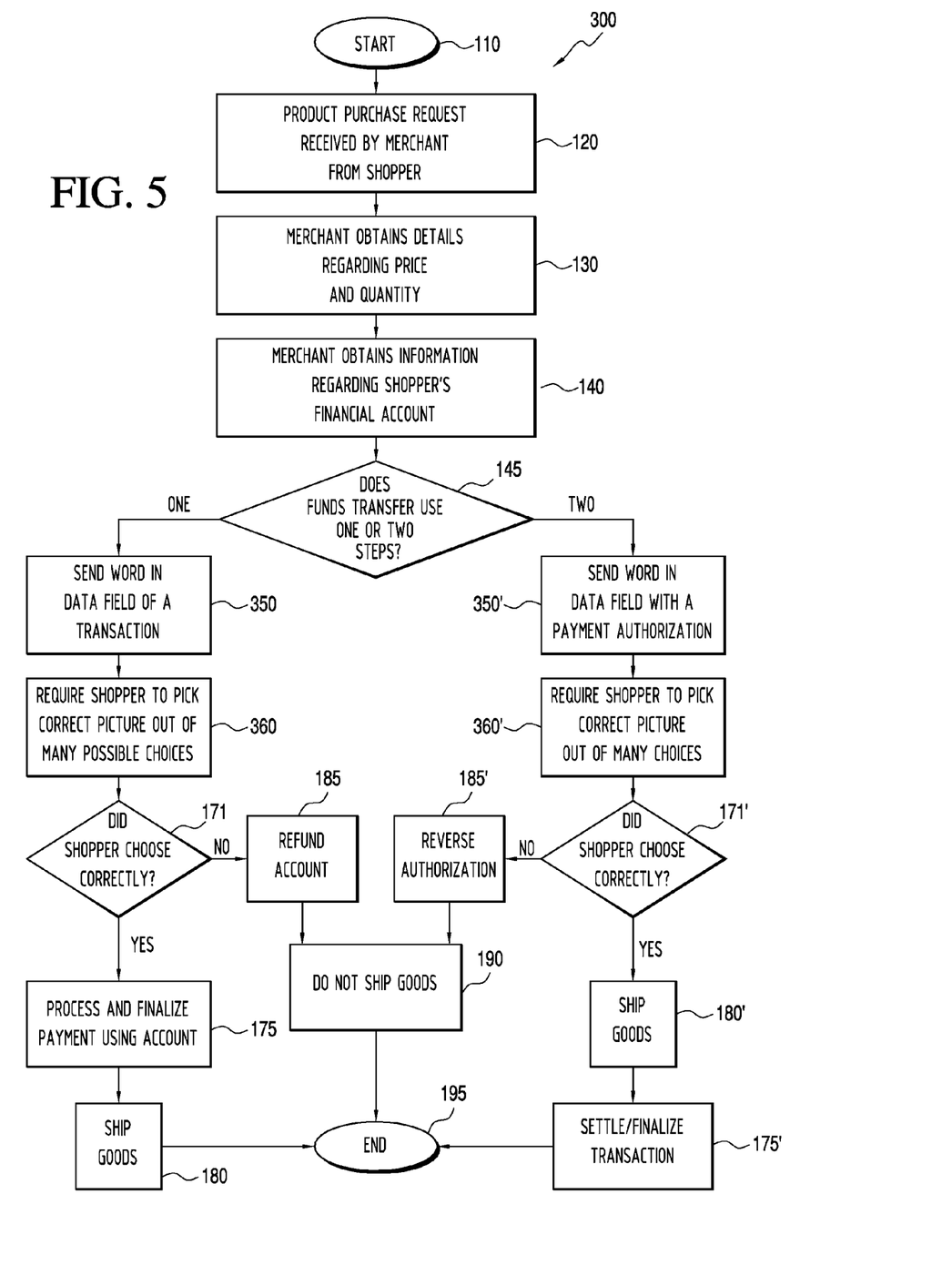
FIG. 5 is a flow chart of a procedure employed by a merchant to verify a financial instrument issued by a financial institution by requiring a shopper pick out a picture associated with a word sent to the institution.

FIG. 5 shows an alternative embodiment where in steps 350 and 350' a word is sent in a data field of an initial transaction or authorization respectively. In steps 360 and 360', the shopper is required to pick a correct picture that corresponds with the word out of many possible choices shown on a website. For example, the word "cat" could be sent and a picture of a cat could be presented with many other pictures on a merchant's website, requiring an owner/shopper to correctly choose the picture associated with the word.

Figure 6:
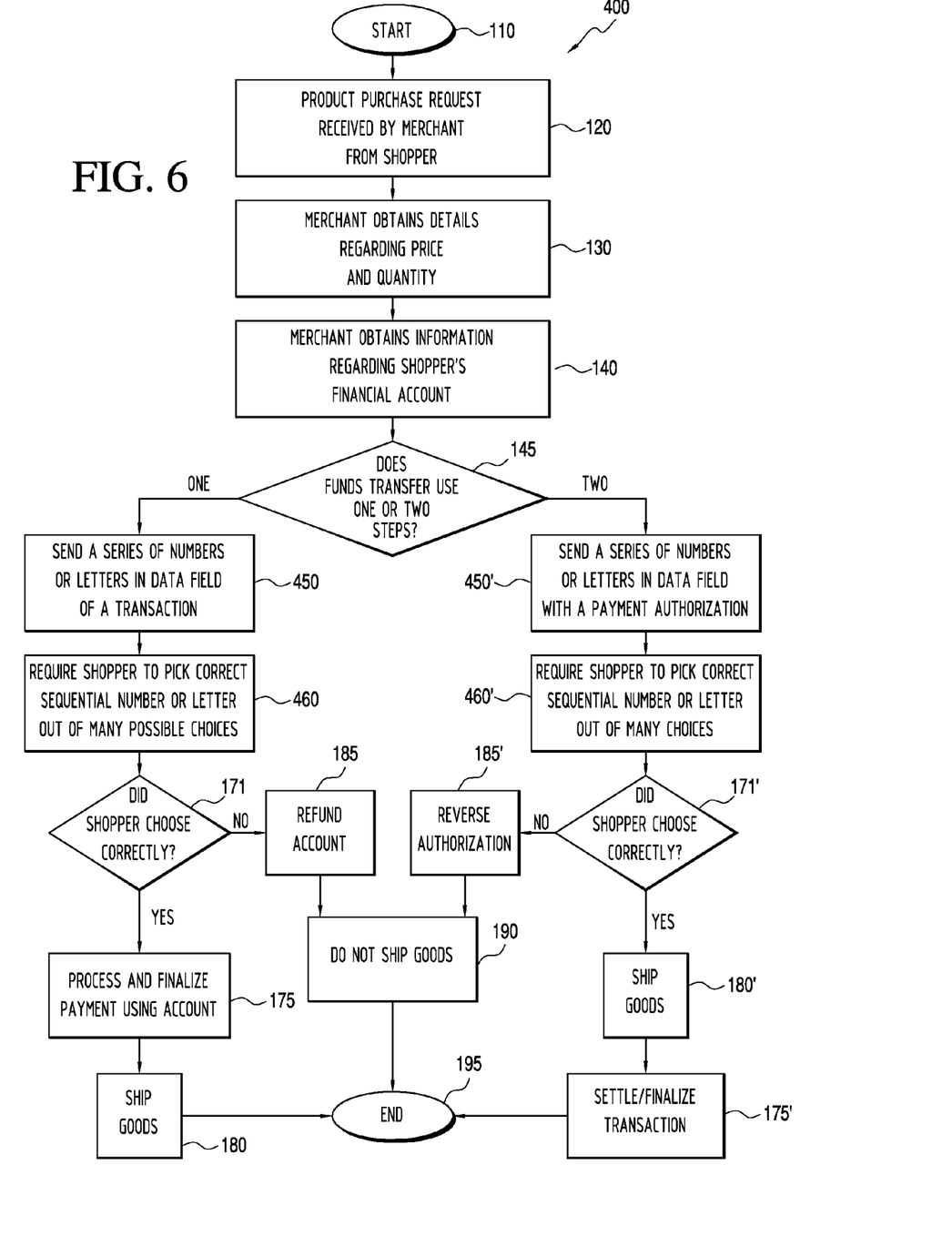
FIG. 6 is a flow chart of a procedure employed by a merchant to verify a financial instrument issued by a financial institution by requiring a shopper pick a correct sequential number of letter based on a series of numbers or letters sent to the institution.

A fourth embodiment of the present invention is detailed in FIG. 6. In this embodiment, a series of numbers or letters, such as "1, 2, 3" or "a, b, c" is sent with the initial transaction or authorization as illustrated in steps 450 and 450' respectively. In steps 460 and 460', the shopper must then select the correct sequential number in the series from a set of numbers. For example, if the series is "1, 2, 3," the shopper must correctly choose the number "4" from a list of possible answers. Likewise, if the series is "a, b, c," the shopper must correctly choose the letter "d" from a list of possible answers.

Figure 7:
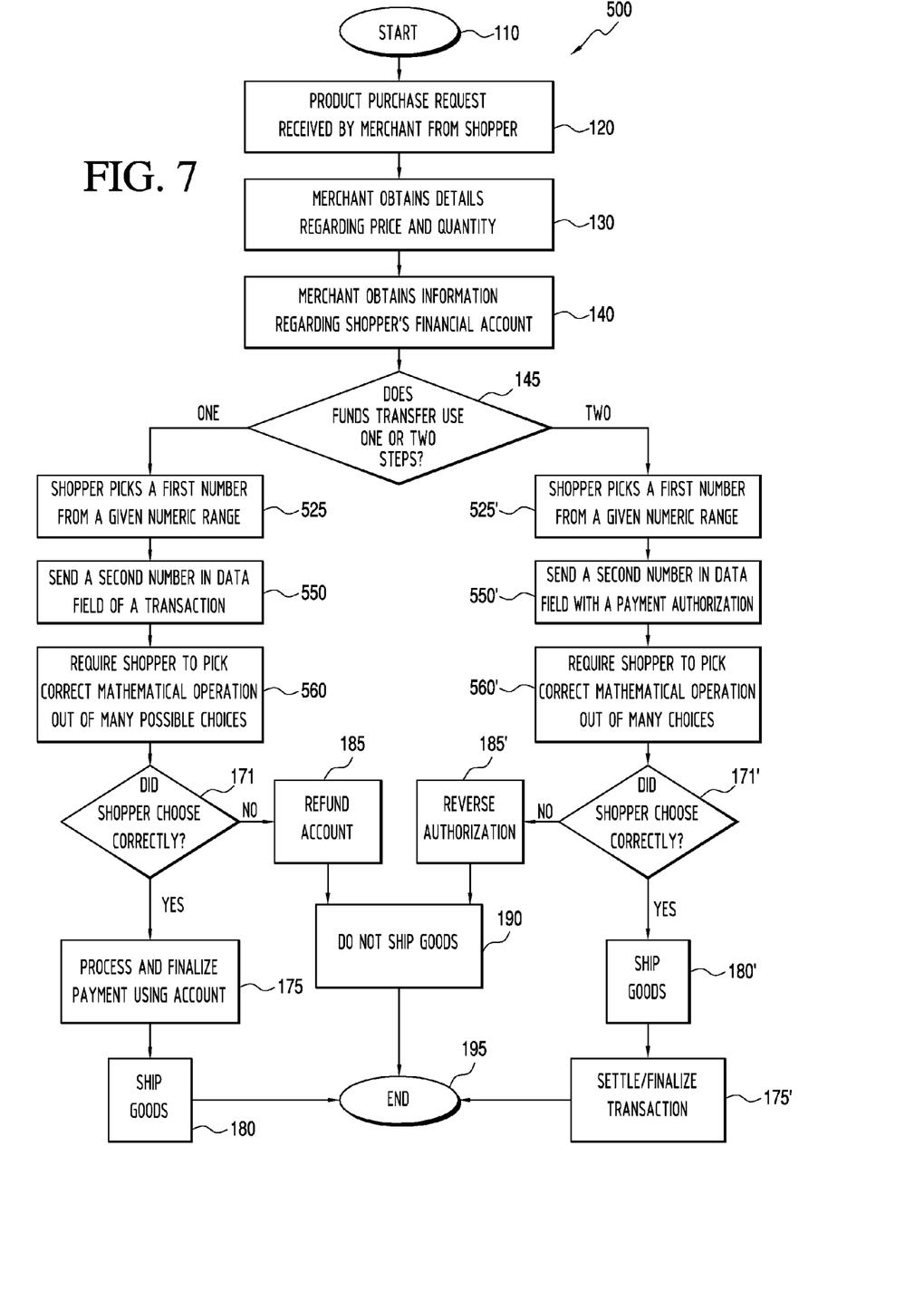
FIG. 7 is a flow chart of a procedure employed by a merchant to verify a financial instrument issued by a financial institution by requiring a shopper to pick out a correct mathematical equation based on numbers sent to the institution.

FIG. 7 details a fifth embodiment. In a steps 525 and 525', a shopper must choose a first number in a given numeric range (e.g., pick a number between one and one thousand). A second number is then sent in a data field in steps 550 and 550'. In steps 560 and 560' the shopper would then have to provide a mathematical operation that would produce the first number they chose based on the second number provided. For example, if the shopper selected the number 783 and the data field included the number 754, then the user would provide the mathematical operation "subtract 29."

Figure 8:
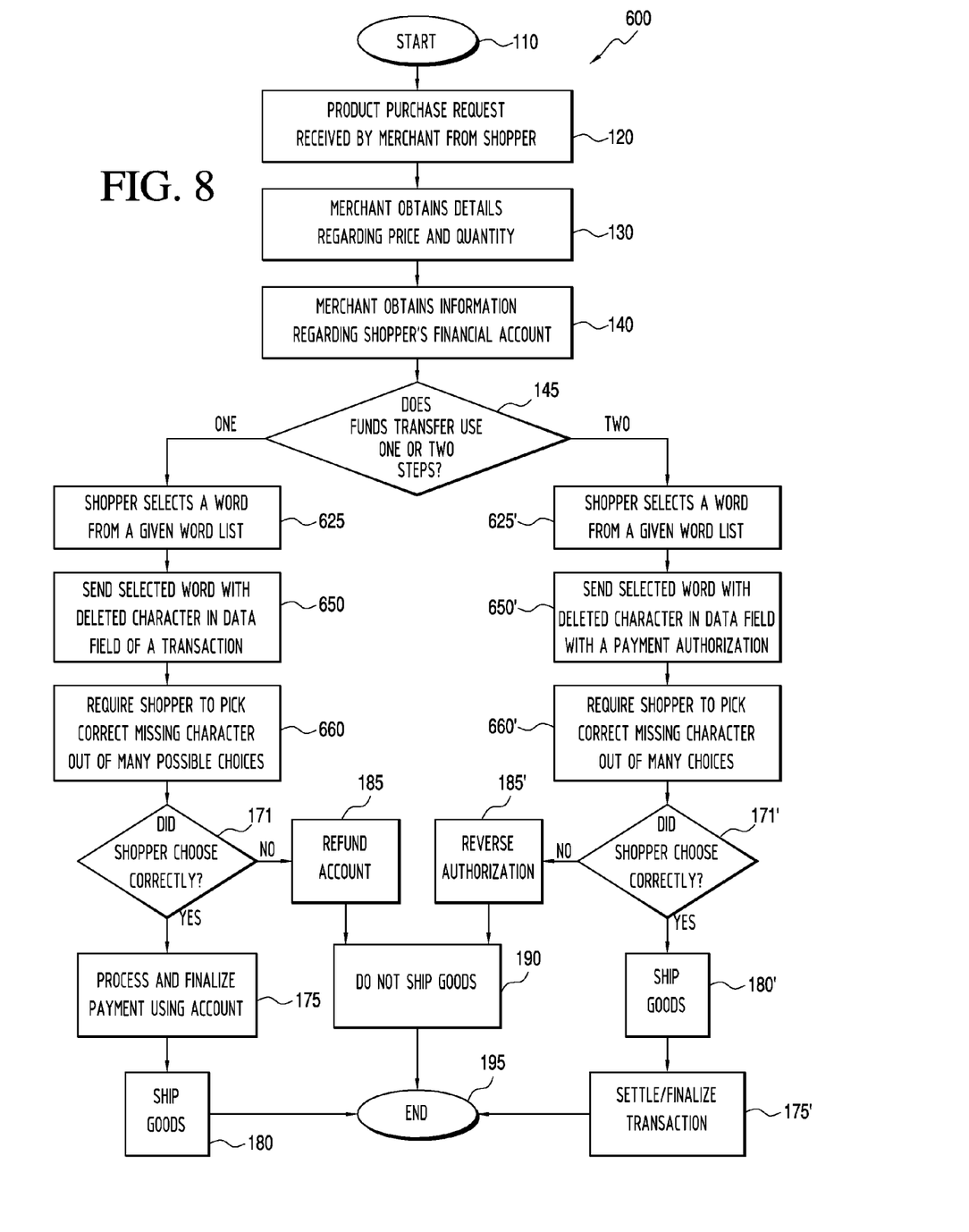
FIG. 8 is a flow chart of procedure employed by a merchant to verify a financial instrument issued by a financial institution by requiring a shopper to pick out a missing letter associated with a word having a missing letter sent to the institution.

FIG. 8 shows another embodiment including a steps 625 and 625' wherein a shopper chooses a word from a list of words. Each of the words in the list is formed from alphanumeric characters. A "word" could be any set of alphanumeric characters, such as the word "dog" or the telephone number "703-555-1212." In step 650, the merchant then sends the word, with select letter(s) or number(s) deleted from it, in a data field. In steps 660 and 660' the shopper must then chose the correct missing letter(s) or number(s) that would complete the word. For example, the word "dog" could be chosen by a shopper from a list of words. After determining that characters. "og" were sent in the data field, the user would select the character "d" as the letter missing from the word.

Figure 9:
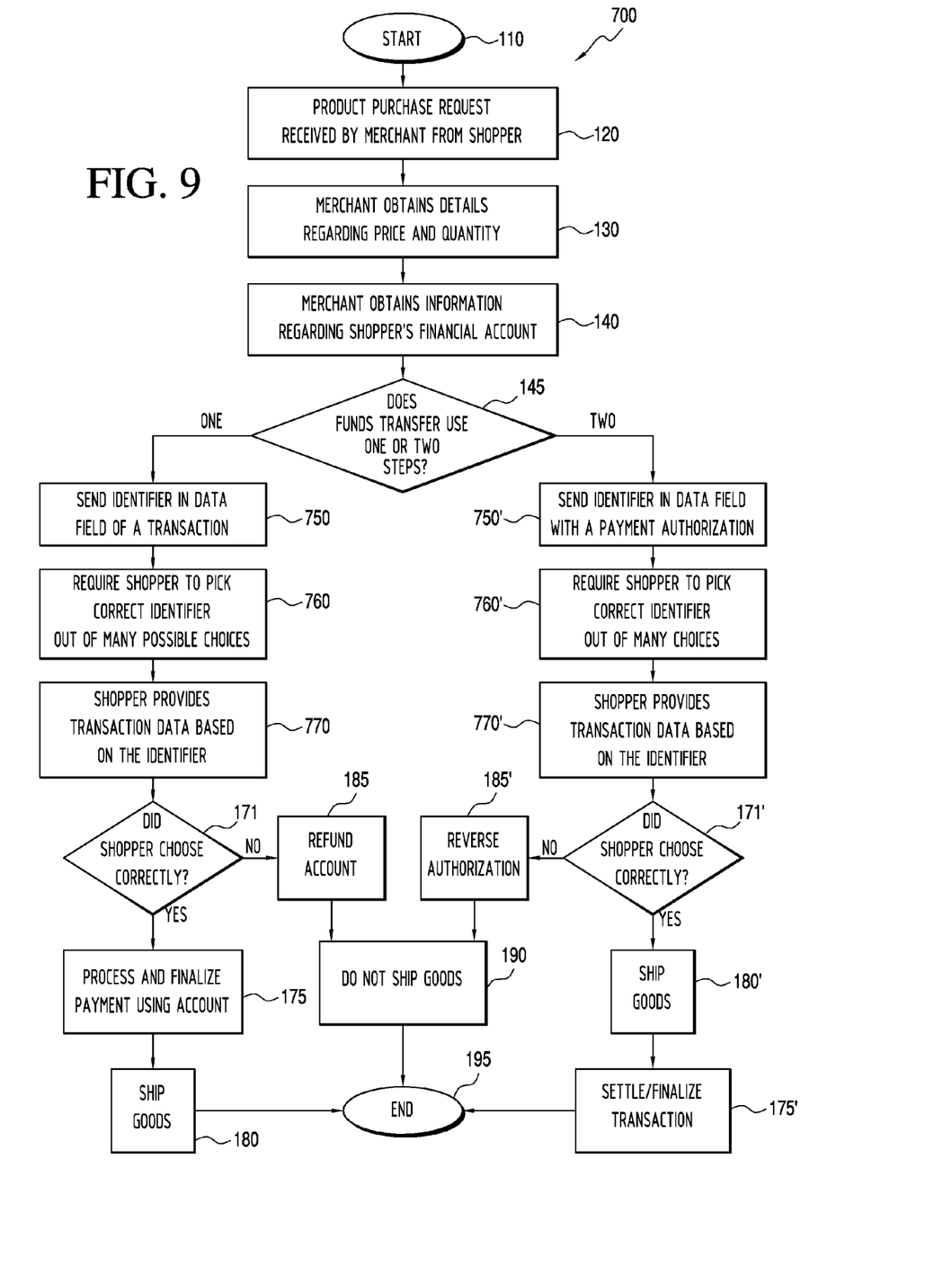
FIG. 9 is a flow chart of procedure employed by a merchant to verify a financial instrument issued by a financial institution by requiring a shopper to pick out an identifier associated with a transaction sent to the institution.

FIG. 9 illustrates a seventh embodiment of the present invention. In this embodiment, a single identifier, for example, "B87", can be sent in, the data field, as, depicted in steps 750 and 750'. In, steps 750 and 750', the shopper would then have to pick the correct identifier (such as "B87") from a list of identifiers and thereby receive an instruction based on the identifier. The instruction could require the shopper to provide, for example, a shared piece of data, from the original transaction, such as the third, ninth and twelfth digit of the financial instrument's number. In steps 760 and 760', the shopper is then required to provide the correct data, from the financial instrument's account number as, requested by the "B87" instruction. If the shopper provided the correct data, then the process can be finalized in steps 175 and 175'.

Figure 10:
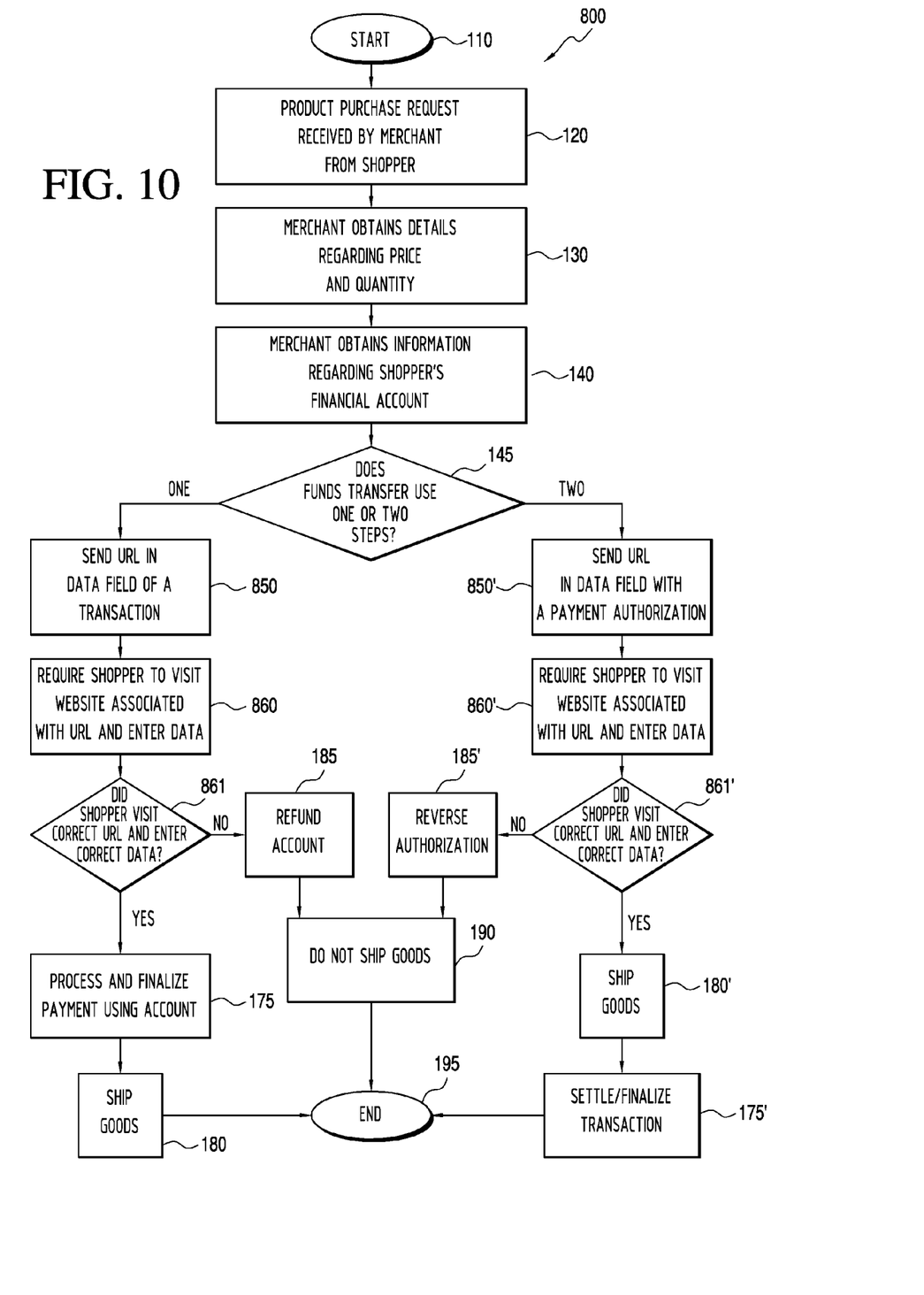
FIG. 10 is a flow chart of procedure employed by a merchant to verify a financial instrument issued by a financial institution by requiring a shopper to visit a website associated with a Uniform Resource Locator (URL) sent to the institution.

An eighth embodiment of the present invention is detailed in FIG. 10. This embodiment requires steps 850 and 850' in which a merchant sends one of many possible website Universal Resource Locators (URLs) in the data field. After accessing their financial institution and reading the data field, a user is required to visit the website associated with the URL specified in the data field and to enter requested transaction data at the website. See steps 860 and 860'. In steps 861 and 861', if the shopper provides the correct data thus proving the shopper visited the correct URL, then the user will be presumed to be a valid user of the instrument.

Figure 11:
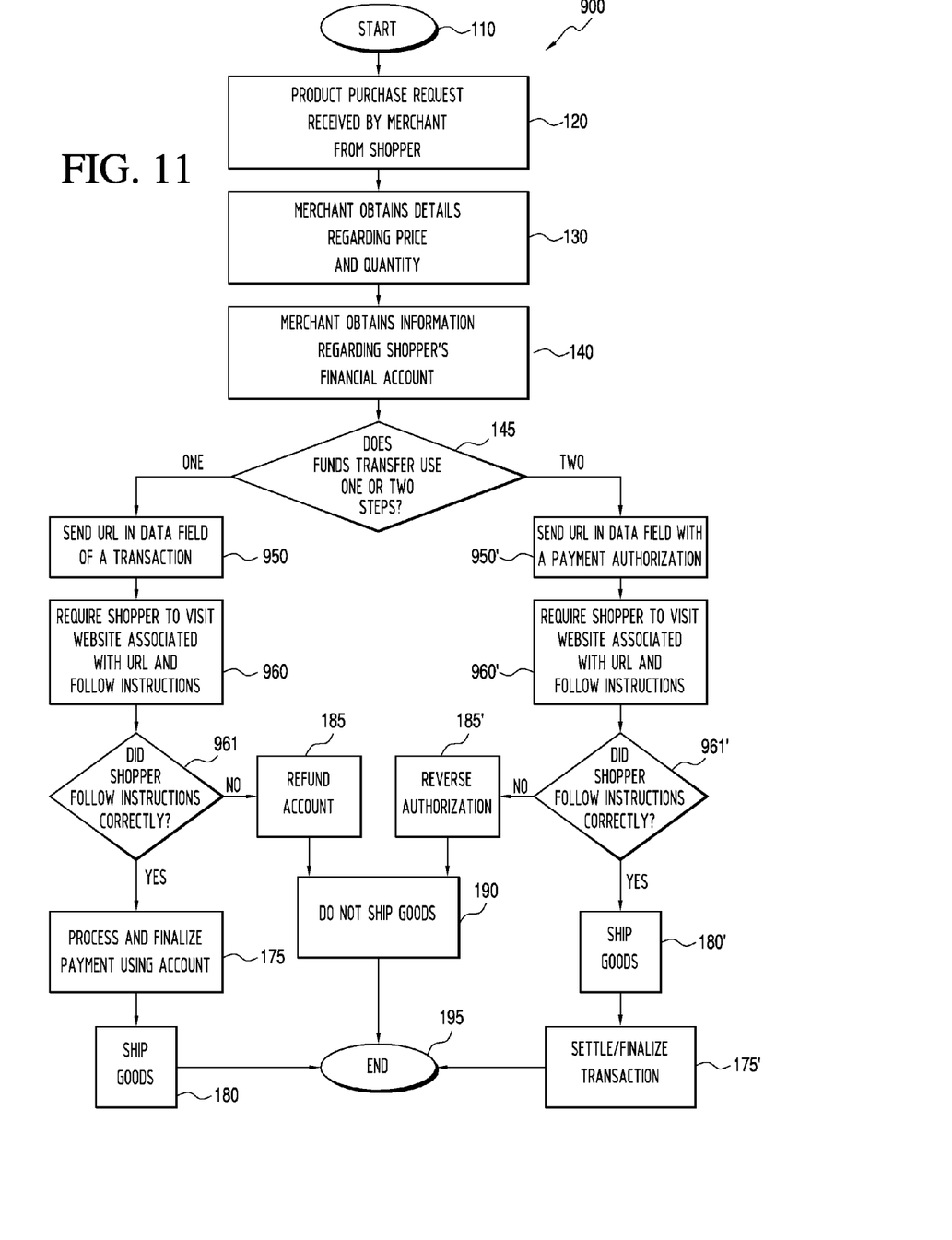
FIG. 11 is a flow chart of procedure employed by a merchant to verify a financial instrument issued by a financial institution by requiring a shopper to visit a website associated with a URL and follow direction found on the website.

Similarly, in a ninth embodiment depicted in FIG. 11, a merchant will send one of many website URLs in the data field. See steps 950 and 950'. In steps 960 and 960', a shopper will visit the website associated with the URL specified in the data field and follow instructions laid out for the shopper on the website. In steps 961, 961' if the shopper follows the instructions correctly, then the shopper is presumed to be a valid user of the financial instrument.

It should be noted that such a method will allow for payment to be made by various financial instruments such as credit payment instrument, debit payment instrument, check or electronic funds transfer. For example, in the case of credit payment instrument transactions, the purchaser name, address, telephone number, credit card and expiration date might be obtained to verify sufficient information to have the transaction go forward. The additional verification described (solving the equation) may then take place before payment is processed. In a similar manner, information can be provided off a check so that a computerized check approval bureau can be contacted to determine whether or not the check is valid even before the verification method of the present invention is used.

Indeed, given these types of financial instruments, it is envisioned that the verification system of the present invention may be used in various ways. For example, this system could be used any time a merchant is transferring money from one financial instrument to another (i.e., cash advances via the Internet or charging an electronic stored value card as in Quasi Money implementations in the micro-commerce area). Additionally, the method may be used for sales in a "card not present" environment such as online, phone, or mail order, where the merchant cannot afford fraud, or the merchant suspects fraud and wants to rule out such fraudulent behavior. The system could also be used in traditional store. A shopper would pick out goods and initiate a transaction but the goods would only be shipped or picked up later after the verification process had been completed.

Such a verification system would also provide a benefit where a merchant would otherwise think that a customer is fraudulent and thus reject a good sale. For example, if the merchant's normal anti-fraud system rejects the shopper, the shopper could then be asked to answer the questions according to the above described method so that the shopper could be verified as legitimate. Such a system could also be used in any online gambling site. Such sites need to verify that the user has a legitimate right to the financial instrument because they are giving the money to the user, and if the user is a fraudulent, the website looses money even before any goods may or may not be shipped.

As noted above, the present invention is an exemplary verification method because it is not based on data printed on a financial instrument but based on real time access to the financial instrument's account maintained by the issuer. Such access can be terminated immediately and also provides an excellent argument should the financial instrument owner repudiate the transaction. If a financial instrument owner should repudiate a purchase, the merchant can simply point out that the issuer of the financial instrument (financial institution) allowed the owner/shopper access to secured transaction information, and that without such information, the owner/shopper would not have been able to answer the merchant's verification question correctly. In order to access the secured transaction information, the financial institution must have thought the shopper was a legitimate user, and therefore, the shopper should not be allowed to repudiate the purchase. This should reduce the number of fraudulent instrument uses, thus reducing the number of successful repudiation claims and charge backs.

Although described with reference to a preferred embodiment of the invention, it should be readily understood that various changes and/or modifications might be made to the invention without departing from the spirit thereof. For example the invention may as mentioned above apply in traditional stores and use in person communication. Therefore, it should be understood that the invention is only intended to be limited the scope of the following claims.

I claim:

1. A method of verifying legitimacy of a financial instrument in connection with a business transaction comprising:
   accepting information about a financial account associated with the financial instrument from a shopper associated with the financial account;
   sending via a computer system a communication to a financial institution that provided the financial account regarding a payment;
   relaying identifier information in a data field of the communication;
   requiring the shopper to obtain the identifier information from the institution and derive verification information from the identifier information;
   confirming that the shopper knows the verification information; and
   continuing with the business transaction if the verification information correctly corresponds to the identifier information, wherein the identifier information is an equation and the verification information is an answer to the equation.

2. The method according to claim 1, wherein the step of sending a communication regarding the payment includes sending a request for authorization of the payment to the financial institution.

3. The method according to claim 2, wherein the step of continuing with the business transaction includes authorizing shipment of goods to the shopper and settling the authorized payment if the shopper knows the verification information.

4. The method according to claim 3, wherein the account is a credit card account.

5. The method according to claim 1, wherein the step of sending a communication regarding the payment includes sending a request for a payment to the financial institution.

6. The method according to claim 5, wherein the step of continuing with the business transaction includes refunding payment if the shopper does not know the verification information.

7. The method according to claim 6, wherein the account is a checking account.

8. The method according to claim 1, wherein the identifier information is a Universal Resource Locator having an associated website with the verification information placed thereon.

9. A method of verifying legitimacy of a financial instrument in connection with a business transaction comprising:
   accepting information about a financial account associated with the financial instrument from a shopper associated with the financial account;
   sending via a computer system a communication to a financial institution that provided the financial account regarding a payment;
   relaying identifier information in a data field of the communication;
   requiring the shopper to obtain the identifier information from the institution and derive verification information from the identifier information;
   confirming that the shopper knows the verification information; and
   continuing with the business transaction if the verification information correctly corresponds to the identifier information, wherein the identifier information is a word and the verification information is knowledge of which picture corresponds to the word.

10. The method according to claim 9, wherein the step of sending a communication regarding the payment includes sending a request for authorization of the payment to the financial institution.

11. The method according to claim 10, wherein the step of continuing with the business transaction includes authorizing shipment of goods to the shopper and settling the authorized payment if the shopper knows the verification information.

12. The method according to claim 9, wherein the step of sending a communication regarding the payment includes sending a request for a payment to the financial institution.

13. A method of verifying legitimacy of a financial instrument in connection with a business transaction comprising:
   accepting information about a financial account associated with the financial instrument from a shopper associated with the financial account;
   sending via a computer system a communication to a financial institution that provided the financial account regarding a payment;
   relaying identifier information in a data field of the communication;
   requiring the shopper to obtain the identifier information from the institution and derive verification information from the identifier information;
   confirming that the shopper knows the verification information; and
   continuing with the business transaction if the verification information correctly corresponds to the identifier information, wherein the identifier information is a series of numbers or letters and the verification information is a sequential number or letter in the series.

14. The method according to claim 13, wherein the step of sending a communication regarding the payment includes sending a request for authorization of the payment to the financial institution.

15. The method according to claim 14, wherein the step of continuing with the business transaction includes authorizing shipment of goods to the shopper and settling the authorized payment if the shopper knows the verification information.

16. The method according to claim 13, wherein the step of sending a communication regarding the payment includes sending a request for a payment to the financial institution.

17. A system for enabling a merchant to verify the legitimacy of a financial instrument issued by a financial institution, associated with a financial account and used by a shopper in connection with a business transaction comprising:

a computer system configured to accept information about the financial account from the shopper along with information about types and quantities of goods the shopper wishes to purchase;

a data field configured to relay identifier information to the financial institution;

verification information that is derived from the identifier information by a shopper;

a data manager configured to confirm that the shopper knows the verification information; and a shipping department configured to ship the goods if the shopper knows the verification information, wherein the identifier information is an equation and the verification information is an answer to the equation.

18. The system according to claim 17, wherein the identifier information is a Universal Resource Locator having an associated website with the verification information placed thereon.

19. The system according to claim 17, wherein the financial instrument is a check, a credit card, or a debit card.

20. A system for enabling a merchant to verify the legitimacy of a financial instrument issued by a financial institution, associated with a financial account and used by a shopper in connection with a business transaction comprising:

a computer system configured to accept information about the financial account from the shopper along with information about types and quantities of goods the shopper wishes to purchase;

a data field configured to relay identifier information to the financial institution;

verification information that is derived from the identifier information by a shopper;

a data manager configured to confirm that the shopper knows the verification information; and a shipping department configured to ship the goods if the shopper knows the verification information, wherein the identifier information is a word and the verification information is knowledge of which picture corresponds to the word.

21. A system for enabling a merchant to verify the legitimacy of a financial instrument issued by a financial institution, associated with a financial account and used by a shopper in connection with a business transaction comprising:

a computer system configured to accept information about the financial account from the shopper along with information about types and quantities of goods the shopper wishes to purchase;

a data field configured to relay identifier information to the financial Institution;

verification information that is derived from the identifier information by a shopper;

a data manager configured to confirm that the shopper knows the verification information; and a shipping department configured to ship the goods if the shopper knows the verification information, wherein the identifier information is a series of numbers and the verification information is a sequential number in the series.

\* \* \* \* \*